(12) United States Patent
Hirakata

(10) Patent No.: US 11,021,063 B2
(45) Date of Patent: Jun. 1, 2021

(54) FUEL CELL VEHICLE AND CONTROL METHOD THEREOF

(71) Applicant: TOYOTA JIDOSHA KABUSHIKI KAISHA, Toyota (JP)

(72) Inventor: Syuji Hirakata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/024,544

(22) PCT Filed: Sep. 24, 2014

(86) PCT No.: PCT/IB2014/001907
§ 371 (c)(1),
(2) Date: Mar. 24, 2016

(87) PCT Pub. No.: WO2015/044746
PCT Pub. Date: Apr. 2, 2015

(65) Prior Publication Data
US 2016/0236536 A1    Aug. 18, 2016

(30) Foreign Application Priority Data

Sep. 26, 2013    (JP) .............................. JP2013-199332

(51) Int. Cl.
*B60H 1/00* (2006.01)
*B60L 3/00* (2019.01)
*B60L 58/30* (2019.01)

(52) U.S. Cl.
CPC ............ *B60L 3/0053* (2013.01); *B60H 1/008* (2013.01); *B60H 1/00385* (2013.01);
(Continued)

(58) Field of Classification Search
CPC ............ B60H 1/00735; B60H 1/00849; B60H 1/00392; B60L 3/0053; B60L 3/00
See application file for complete search history.

(56) References Cited

U.S. PATENT DOCUMENTS 6,290,594 B1 *    9/2001    Osborne .................... B60L 3/00
454/162
6,851,298 B2 *    2/2005    Miura ................. G01M 3/3236
73/40.5 R
(Continued)

FOREIGN PATENT DOCUMENTS

JP    H06-027227 U    4/1994
JP    H06-335536 A    12/1994
(Continued)

OTHER PUBLICATIONS

JP 6-27227U English machine translation, Apr. 12, 1994.*

*Primary Examiner* — Kenneth J Hansen
*Assistant Examiner* — Phillip Decker
(74) *Attorney, Agent, or Firm* — Hunton Andrews Kurth LLP

(57) ABSTRACT

In a vehicle, a first gas sensor detects a hydrogen gas concentration of a vehicle interior front zone. Air-conditioning corresponding to an operation of a suction air switching button or the like is performed until the hydrogen gas concentration of the vehicle interior front zone reaches a predetermined second reference concentration, and any one of interior air mode switching control of an interior/exterior air switching mechanism and stop control of a blower is performed regardless of the operation of the suction air switching button or the like when the hydrogen gas concentration reaches the second predetermined reference concentration.

12 Claims, 5 Drawing Sheets

(52) U.S. Cl.
CPC ..... *B60H 1/00392* (2013.01); *B60H 1/00849* (2013.01); *B60H 1/00978* (2013.01); *B60L 3/00* (2013.01); *B60L 58/30* (2019.02); *B60H 1/00764* (2013.01); *Y02T 90/40* (2013.01)

(56) References Cited

U.S. PATENT DOCUMENTS

| | | | | |
|---|---|---|---|---|
| 7,028,724 | B2* | 4/2006 | Cohen | F02M 21/0206 |
| | | | | 141/392 |
| 7,363,997 | B2* | 4/2008 | Sato | B60L 3/0053 |
| | | | | 180/65.31 |
| 7,966,945 | B1* | 6/2011 | Miller | B61C 7/04 |
| | | | | 105/35 |
| 7,970,528 | B2* | 6/2011 | Janarthanam | B60H 1/008 |
| | | | | 123/321 |
| 9,845,014 | B2* | 12/2017 | Kim | B60L 3/04 |
| 10,040,569 | B2* | 8/2018 | Filangi | B60L 50/72 |
| 10,305,134 | B2* | 5/2019 | Takeyama | H01M 8/2475 |
| 2004/0063394 | A1 | 4/2004 | Brenner et al. | |
| 2005/0044863 | A1* | 3/2005 | Maeda | B60H 1/00764 |
| | | | | 62/125 |
| 2005/0182574 | A1* | 8/2005 | Sano | G01N 33/005 |
| | | | | 702/30 |
| 2005/0228596 | A1* | 10/2005 | Shoji | G01N 27/18 |
| | | | | 702/24 |
| 2007/0243808 | A1* | 10/2007 | Mathur | B60H 1/00764 |
| | | | | 454/75 |
| 2008/0300729 | A1 | 12/2008 | Bono | |
| 2009/0017745 | A1* | 1/2009 | Kum | H01M 8/04089 |
| | | | | 454/156 |
| 2009/0058065 | A1* | 3/2009 | Park | B62D 21/07 |
| | | | | 280/830 |
| 2009/0058145 | A1* | 3/2009 | Park | B62D 21/02 |
| | | | | 296/204 |
| 2009/0226792 | A1* | 9/2009 | Hamada | B60K 1/04 |
| | | | | 429/413 |
| 2010/0144261 | A1* | 6/2010 | Barkic | B60H 1/00457 |
| | | | | 454/75 |
| 2010/0233562 | A1* | 9/2010 | Kajiwara | G01M 3/007 |
| | | | | 429/444 |
| 2011/0059341 | A1* | 3/2011 | Matsumoto | B60H 1/00278 |
| | | | | 429/82 |
| 2012/0021313 | A1* | 1/2012 | Yasuda | H01M 8/04201 |
| | | | | 429/416 |
| 2019/0291573 | A1* | 9/2019 | Banno | B62D 25/2009 |
| 2019/0308487 | A1* | 10/2019 | Badger, II | B60H 1/00771 |
| 2020/0101821 | A1* | 4/2020 | Pike | B60H 3/0085 |

FOREIGN PATENT DOCUMENTS

| | | | |
|---|---|---|---|
| JP | 2004-131055 A | | 4/2004 |
| JP | 2006-278088 A | | 10/2006 |
| JP | 2007-045349 A | | 2/2007 |
| JP | 2009-292190 A | | 12/2009 |
| JP | 2009295464 A | * | 12/2009 |
| KR | 20100060647 A | * | 6/2010 |

* cited by examiner

FUEL CELL VEHICLE AND CONTROL METHOD THEREOF

CROSS-REFERENCE TO RELATED APPLICATIONS

This is a national phase application based on the PCT International Patent Application No. PCT/I62014/001907 filed Sep. 24, 2014, claiming priority to Japanese Patent Application No. 2013-199332 filed Sep. 26, 2013, the entire contents of both of which are incorporated herein by reference.

BACKGROUND OF THE INVENTION

1. Field of the Invention

The present invention relates to a fuel cell vehicle and a control method thereof.

2. Description of Related Art

In a fuel cell vehicle, a prevention technique for preventing hydrogen gas leaking from a fuel cell or a fuel tank or from a gas supply pipe connecting them to each other from entering a vehicle interior has been proposed (for example, see Japanese Patent Application Publication No. 2009-292190 (JP 2009-292190 A)).

In the prevention technique proposed in JP 2009-292190, a through-hole in a vehicle floor is separated away from a place in which leakage is supposed to occur and then a gas supply from the tank is intercepted when hydrogen gas leakage occurs. However, there is room for improvement in making the entry of leaking hydrogen gas into the vehicle interior difficult in consideration of air-conditioning of the vehicle interior. In addition, there is need for simplification of a configuration or control for making the entry of leaking hydrogen gas into the vehicle interior difficult, a decrease in vehicle manufacturing cost for making the entry of leaking hydrogen gas into the vehicle interior difficult, and the like.

SUMMARY OF THE INVENTION

A first aspect of the invention provides a fuel cell vehicle including a fuel cell that is supplied with fuel gas and oxidizing gas and that generates electric power and a fuel gas tank that stores the fuel gas to be supplied to the fuel cell. The fuel cell vehicle further includes an air-conditioning control unit that air-conditions a vehicle interior using one of vehicle interior air and vehicle exterior air and a gas sensor that detects a fuel gas concentration of fuel gas leaking from a zone in which the fuel cell and the fuel gas tank are mounted. The air-conditioning control unit performs priority control of putting priority on the vehicle interior air when it is determined that the detected fuel gas concentration is equal to or greater than a predetermined threshold concentration.

The fuel cell vehicle causes the air-conditioning control unit to air-condition the vehicle interior using any one of the vehicle interior air and the vehicle exterior air and prevents fuel gas from unintentionally entering the vehicle interior as follows.

When fuel gas leakage occurs, the leaking fuel gas (hereinafter, referred to as leaking fuel gas) can diffuse from the zone in which the fuel cell and the fuel gas tank are mounted as a leakage position to various parts of the vehicle. When there is no countermeasure in the air-conditioning of the vehicle interior, the diffused leaking fuel gas may be mixed into the vehicle exterior air to be air-conditioned and enter the vehicle interior. In the fuel cell vehicle, the gas sensor detects the concentration of the leaking fuel gas and the priority control of putting priority on the air-conditioning using the vehicle interior air when the detected fuel gas concentration is equal to or greater than the predetermined threshold concentration. Accordingly, the vehicle exterior air into which the leaking fuel gas may be mixed is excluded from the air to be air-conditioned. As a result, according to the fuel cell vehicle, it is possible to prevent the leaking fuel gas from entering the vehicle interior.

The gas sensor may be disposed in a vehicle interior front zone which is a zone below a hood on a vehicle front side and which occupies the front side of the vehicle interior. In this case, even when the leaking fuel gas diffuses into the vehicle interior front zone with a gas concentration of the predetermined threshold concentration or greater, the air (vehicle exterior air) in the vehicle interior front zone into which the leaking fuel gas has diffused can be excluded from the air-conditioning target. Accordingly, in the fuel cell vehicle according to the above-mentioned aspect, it is possible to further satisfactorily prevent the leaking fuel gas having diffused into the vehicle interior front zone from entering the vehicle interior.

The air-conditioning control unit may perform the priority control when it is determined that the detected fuel gas concentration is equal to or greater than the predetermined threshold concentration in a state where the vehicle runs forward at a speed equal to or lower than a predeterthined threshold speed. This fuel cell vehicle has the following advantages.

If fuel gas leakage occurs in the fuel cell vehicle, the leaking fuel gas may diffuse into the vehicle interior front zone as described above and may be used for air-conditioning as the vehicle exterior air along with air present in the vehicle interior front zone. On the other hand, when the vehicle runs forward, an air flow flowing from the vehicle front side to the vehicle rear side is generated in the vicinity of the vehicle and this air flow is also generated in the vehicle interior front zone below the hood on the vehicle front side. The air flow passes through the vehicle interior front zone and flows in the zone under the vehicle floor, or flows out of the vehicle along a front windowshield via a cowl which is a joint between the hood and the front windowshield. The air flow generated during the forward running of the vehicle in this way becomes higher in flow rate as the forward vehicle speed becomes higher. Accordingly, when the forward vehicle speed is low, the leaking fuel gas having diffused into the vehicle interior front zone below the hood on the vehicle front side tends to stay in the vehicle interior front zone.

In the fuel cell vehicle, on the basis of the above-mentioned knowledge, when the leaking gas concentration in the vehicle interior front zone is equal to or greater than the predetermined threshold concentration in a state where the vehicle runs forward at a speed of a predetermined threshold speed or less, the air-conditioning using the vehicle interior air is performed with priority. Accordingly, the air in the vehicle interior front zone into which the leaking fuel gas has diffused is excluded from the air-conditioning target. Therefore, in the fuel cell vehicle, the air in the vehicle interior front zone into which the leaking fuel gas has diffused does not enter the vehicle interior as the vehicle exterior air. As a result, in the fuel cell vehicle, even when the leaking fuel gas stays in the vehicle interior front zone until the leaking gas concentration in the vehicle interior front zone reaches the predetermined threshold concentration, it is possible to prevent the leaking fuel gas staying in the vehicle interior front zone from entering the vehicle interior.

On the other hand, if the vehicle runs forward at a speed greater than the predetermined threshold speed, the priority control is not performed even when the leaking gas concentration in the vehicle interior front zone is equal to or greater than the predetermined threshold concentration. However, since the above-mentioned air flow is necessarily generated in the state where the vehicle runs forward at a speed greater than the predetermined threshold speed, the leaking fuel gas having diffused into the vehicle interior front zone flows out of the vehicle from the vehicle interior front zone by the air flow and hardly stays in the vehicle interior front zone. Accordingly, even when the air in the vehicle interior front zone is conditioned and is allowed to enter the vehicle interior in the state where the vehicle runs forward at a speed greater than the predetermined threshold speed, it is possible to prevent the leaking fuel gas from entering the vehicle interior.

The fuel cell vehicle may further include an air-conditioning operation device that is disposed in the vehicle interior, that is operated by an operator, and that outputs an air-conditioning signal corresponding to the operation, an interior/exterior air switching device that switches suction air flowing into an air-conditioning device conditioning air to any one of vehicle interior air and vehicle exterior air, and a blower that blows air air-conditioned by the air-conditioning device into the vehicle interior. The air-conditioning control unit puts priority on the air-conditioning of the vehicle interior air by controlling the driving of at least one of the interior/exterior air switching device and the blower regardless of the air-conditioning signal so as to suppress the entry of the vehicle exterior air into the vehicle interior when the air-conditioning signal of the air-conditioning operation device is input and it is determined that the detected fuel gas concentration is equal to or greater than the predetermined threshold concentration. In this case, on the basis of an operator's operation of the air-conditioning operation device, the drivings of the air-conditioning device, the interior/exterior air switching device, and the blower are controlled by the air-conditioning control unit in response to the air-conditioning signal from the air-conditioning operation device. Accordingly, the fuel cell vehicle air-conditions the vehicle interior to an environment corresponding to the operator's operation intention for the air-conditioning operation device, that is, the operator's air-conditioning intention. In the fuel cell vehicle, the unintentional entry of the fuel gas into the vehicle interior is prevented as follows while air-conditioning the vehicle interior.

Leaking fuel gas may diffuse into the vehicle interior front zone below the hood on the vehicle front side and may stay in the vehicle interior front zone. In the fuel cell vehicle, when it is determined that the detected fuel gas concentration is equal to or greater than the predetermined threshold concentration, the driving of at least one of the interior/exterior air switching device and the blower is controlled regardless of the air-conditioning signal so as to prevent the vehicle exterior air from entering the vehicle interior. Since the vehicle exterior air is air in the vehicle interior front zone or includes the air in the zone, the driving of at least one of the interior/exterior air switching device and the blower is controlled so as to prevent the air in the vehicle interior front zone from entering the vehicle interior. Accordingly, in the fuel cell vehicle, even when the leaking fuel gas stays in the vehicle interior front zone until the leaking gas concentration reaches the predetermined threshold concentration, it is possible to prevent the leaking fuel gas staying in the vehicle interior front zone from entering the vehicle interior by controlling the driving of at least one of the interior/exterior air switching device and the blower as described-above. The prevention of the leaking fuel gas from entering the vehicle interior is achieved by controlling the driving of the interior/exterior air switching device or the blower provided in the vehicle. Accordingly, since the device configuration or control is simplified and a new device configuration is not necessary, it is possible to contribute to a decrease in cost.

The air-conditioning control unit may control at least one of the interior/exterior air switching device and the blower so as to control the interior/exterior air switching device to switch the suction air into the air-conditioning device to the vehicle interior air and to control driving of the blower to a decreased air volume side including an air volume of zero regardless of the air-conditioning signal when it is determined that the detected fuel gas concentration is equal to or greater than the predetermined threshold concentration. In this case, since the vehicle interior air is allowed to enter the air-conditioning device and the air in the vehicle interior front zone is not allowed to enter the air-conditioning device, it is possible to improve the effectiveness of preventing the leaking fuel gas from entering the vehicle interior. It is possible to improve the effectiveness of preventing the leaking fuel gas from entering the vehicle interior even by controlling the driving of the blower to the decreased air volume side including the air volume of zero. In this case, by controlling the driving of the blower for the air volume of zero, it is possible to further satisfactorily prevent the leaking fuel gas from entering the vehicle interior.

A second aspect of the invention provides a control method of a fuel cell vehicle. The control method includes detecting a fuel gas concentration of fuel gas leaking from a zone in which a fuel cell and a fuel gas tank are mounted in the fuel cell vehicle and performing priority control of putting priority on air-conditioning using vehicle interior air than air-conditioning using vehicle exterior air when it is determined that the detected fuel gas concentration is equal to or greater than a predetermined threshold concentration.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described with reference to the accompanying drawings.

Figure 1:
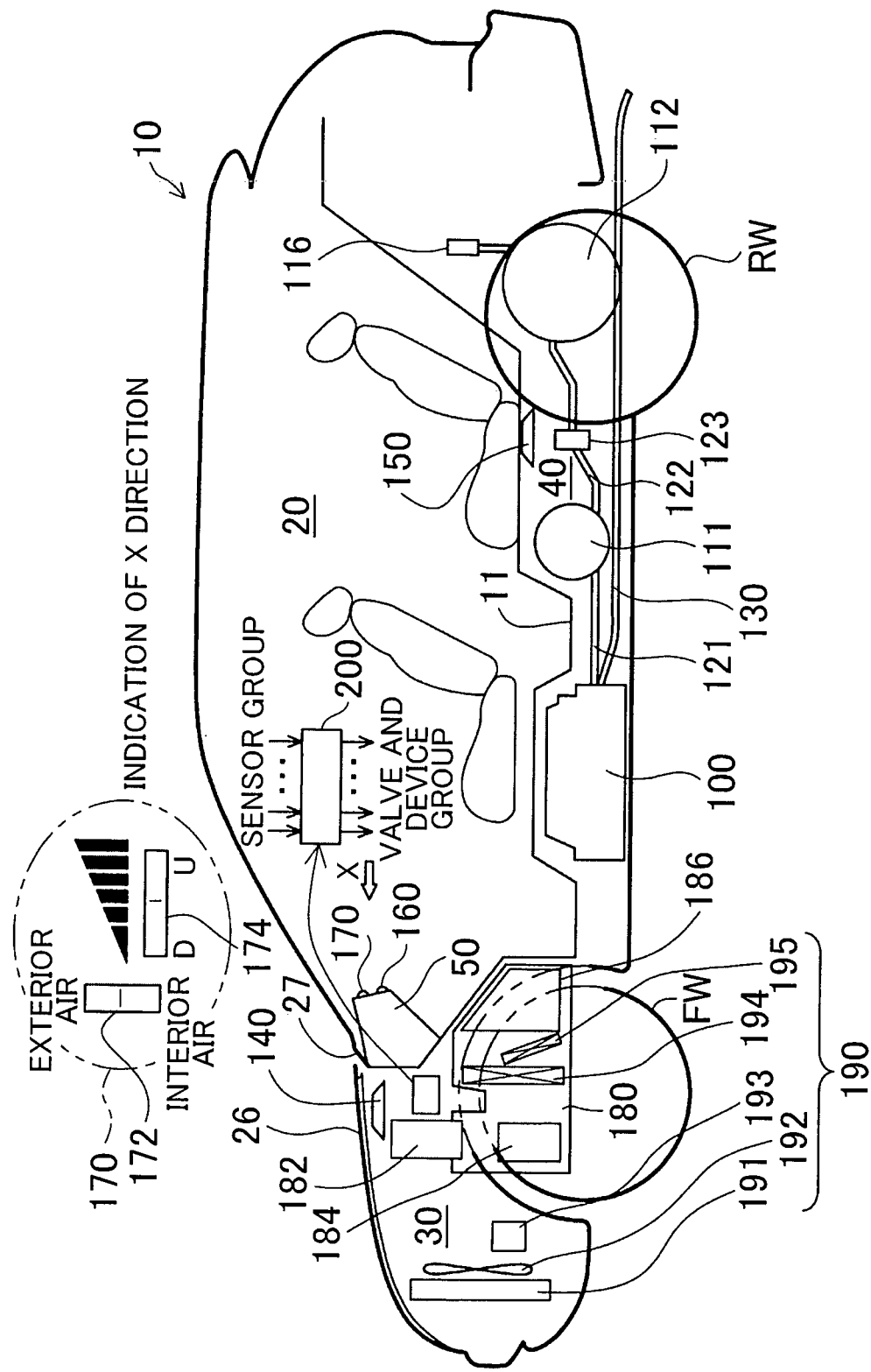
FIG. 1 is a diagram schematically illustrating a configuration of a vehicle 10 according to an embodiment of the invention.

FIG. 1 is a diagram schematically illustrating a configuration of a vehicle 10 according to an embodiment of the invention. The vehicle 10 according to this embodiment includes a fuel cell 100, a first gas tank 111, a second gas tank 112, a first gas sensor 140, a second gas sensor 150, an alarm lamp 160, an air-conditioning setting switch group 170, an air-conditioner unit 180, and a controller 200. The fuel cell 100 is disposed below an underbody 11 defining a vehicle interior 20, that is, between front wheels FW and rear wheels RW below the floor of the vehicle interior 20, and generates electric power with a supply of hydrogen gas and oxidizing gas. The generated electric power is transmitted to a motor (not illustrated) by the controller 200 to be described later and is used as a driving force of the vehicle 10.

Both gas tanks of the first gas tank 111 and the second gas tank 112 are transversely disposed below the underbody 11 so as to extend in a vehicle width direction, are disposed closer to the rear wheels RW than the fuel cell 100 in a vehicle longitudinal direction, and store hydrogen gas. The second gas tank 112 is transversely disposed between the opposite rear wheels RW so as not to interfere with an axle of the rear wheels RW. The first gas tank 111 is transversely disposed at the middle position between the fuel cell 100 and the second gas tank 112 and is connected to the fuel cell 100 via a first hydrogen supply pipe 121. A second hydrogen supply pipe 122 is disposed between the first gas tank 111 and the second gas tank 112 via a cutoff valve 123. The first hydrogen supply pipe 121 and the second hydrogen supply pip 122 along with the cutoff valve 123 constitute a gas supply system, and supply hydrogen gas from both gas tanks of the first gas tank 111 and the second gas tank 112 to the fuel cell 100 under the driving control of gas supply valves (main valves) (not illustrated) attached to caps of both tanks and the cutoff valve 123 by the controller 200. The first gas tank 111 and the second gas tank 112 are charged with gas by connecting a gas supply pipe to a gas supply port 116 in a gas station (not illustrated).

Both gas sensors of the first gas sensor 140 and the second gas sensor 150 are constituted by a gas sensor that can quantitatively detect a hydrogen gas concentration, such as a catalytic combustion type, a controlled-potential electrolysis, a gas-heat electrically-driven type, and an infrared absorption type. The first gas sensor 140 is disposed in a vehicle interior front zone 30, which is partitioned from the vehicle interior 20 by the underbody 11, and is located in the vicinity of a cowl 27 which is a joint between a hood 26 and a front windowshield. The first gas sensor 140 detects a hydrogen gas concentration s1 of the vehicle interior front zone 30 above the vehicle interior side in the vehicle interior front zone 30 and outputs a detection signal thereof to the controller 200 to be described later. In this case, the vehicle interior front zone 30 is also a zone below the hood 26 on the vehicle front side as illustrated in the drawing. The second gas sensor 150 is disposed a vehicle interior underfloor zone 40 which is partitioned from the vehicle interior 20 by the underbody 11 from the fuel cell 100 to the second gas tank 112, detects a hydrogen gas concentration s2 of the vehicle interior under-floor zone 40, and outputs a detection signal thereof to the controller 200. In this embodiment, the second gas sensor 150 is disposed above the cutoff valve 123 in the vehicle interior under-floor zone 40. By disposing the second gas sensor 150 above the cutoff valve 123 in this way, gas leakage can be detected even when a gas leakage position in the gas supply system including the first hydrogen supply pipe 121 and the second hydrogen supply pipe 122 is any one of the gas pipe, the tank cap valve, and the cutoff valve 123.

The alarm lamp 160 is disposed in an instrument panel (hereinafter, referred to as in-panel 50) of the vehicle interior 20 and is turned on under the controller 200 to be described later. The alarm lamp 160 is configured to be turned on in a flickering manner or to be turned on in various colors at the time of continuous lighting and is turned on in a turning-on state defined by the controller 200.

The air-conditioning setting switching group 170 is disposed in the in-panel 50 and includes an air-conditioner switch (not illustrated) for setting the ON and OFF states of an air-conditioner and an outlet selecting switch for selecting an air outlet in addition to a suction air switching button 172 and an air volume adjusting switch 174. The switch signals of various switches operated by the operator are output to the controller 200 to be described later. The suction air switching button 172 sets the suction air to be introduced into the air-conditioner unit 180 to be described to any one of interior air in the vehicle interior 20 (hereinafter, simply referred to as interior air) and vehicle exterior air, that is, exterior air (hereinafter, simply referred to as exterior air) including air in the vehicle interior front zone 30. The suction air switching button 172 outputs a mode selection signal of an interior air mode or an exterior air mode to the controller 200 depending on a switch operating state corresponding to the operator's operation with the air-conditioning intention. The air volume adjusting switch 174 sets an output air volume from a blower 184 of the air-conditioner unit 180 to be described later. The air volume adjusting switch 174 sets the output air volume depending on the switch operating state corresponding to the operator's operation with the air-conditioning intention and outputs an air volume signal corresponding to the set output air volume to the controller 200.

The air-conditioner unit 180 is disposed on the front side of the vehicle interior 20, is configured to condition any air of the interior air and the exterior air and to output the conditioned air to the vehicle interior 20, and includes an interior/exterior air switching device 182, a blower 184, an outlet changing mechanism 186, and some devices of an air-conditioning device group 190. The driving of the interior/exterior air switching device 182 is controlled by the controller 200 in response to the mode selection signal output from the suction air switching button 172 by the operator's operation so as to switch the suction air into the air-conditioning devices of the air-conditioning device group 190 received in the air-conditioner unit 180 to the interior air or the exterior air. The driving of the blower 184 is controlled by the controller 200 in response to the air volume signal output from the air volume adjusting switch 174 by the operator's operation so as to blow the air conditioned by the air-conditioning device group 190 into the vehicle interior 20 with the air volume set by the air volume adjusting switch 174. The driving of the outlet changing mechanism 186 is controlled by the controller 200 so as to guide the conditioned air to the outlet set by an outlet selecting switch (not illustrated).

The air-conditioning device group 190 includes a condenser 191, a fan 192, and a compressor 193 disposed outside the air-conditioner unit 180, and an evaporator 194 and a heater core 195 disposed in the air-conditioner unit 180. The condenser 191, the compressor 193, and the evaporator 194 constitute a refrigerant circulation system along with a refrigerant pipe (not illustrated) and cool the air taken in by the blower 184. Since the heater core 195 heats the air with heat from a heat source (not illustrated), the air-conditioning device group 190 sends out the conditioned air adjusted to various temperatures to the outlet changing mechanism 186 by adjusting an air volume ratio of cool air and hot air. The driving of the air-conditioning devices of the air-conditioning device group 190 is controlled by the controller 200 so as to condition the suction air to the temperature set through the use of a temperature setting switch (not illustrated).

The controller 200 is configured as a logic circuit centered on a microcomputer and specifically includes a CPU (not illustrated) that performs a predetermined computation and the like in accordance with a predetermined control program, a ROM (not illustrated) that stores a control program, a control program, and the like required for causing the CPU to perform various computation processes in advance, a RAM (not illustrated) from and to which a variety of data required for causing the CPU to perform various computation processes is temporarily read and written, and an input and output port (not illustrated) through which various signals are input and output. The controller 200 is mounted in and fixed and supported to the vehicle interior front zone 30 and receives inputs of sensor detection values of a vehicle speed sensor, an accelerator sensor, and the like (not illustrated) in addition to the first gas sensor 140, the second gas sensor 150, and the suction air switching button 172 and the air volume adjusting switch 174 of the air-conditioning setting switching group 170. The controller 200 performs comprehensive control of the entire vehicle 10 such as power generation control of the fuel cell 100 based on the sensor detection values, specifically, hydrogen gas supply control to the fuel cell 100, generated power discharge control, air-conditioning control of the air-conditioner unit 180, and vehicle interior inflow limiting control. A variety of controls as a basis of the vehicle 10 such as the operation of the fuel cell 100 or the vehicle running may be performed by a controller independent of the controller 200 and the controller 200 may perform air-conditioning-relevant control such as the vehicle interior inflow limiting control using the air-conditioner unit 180.

Figure 2:
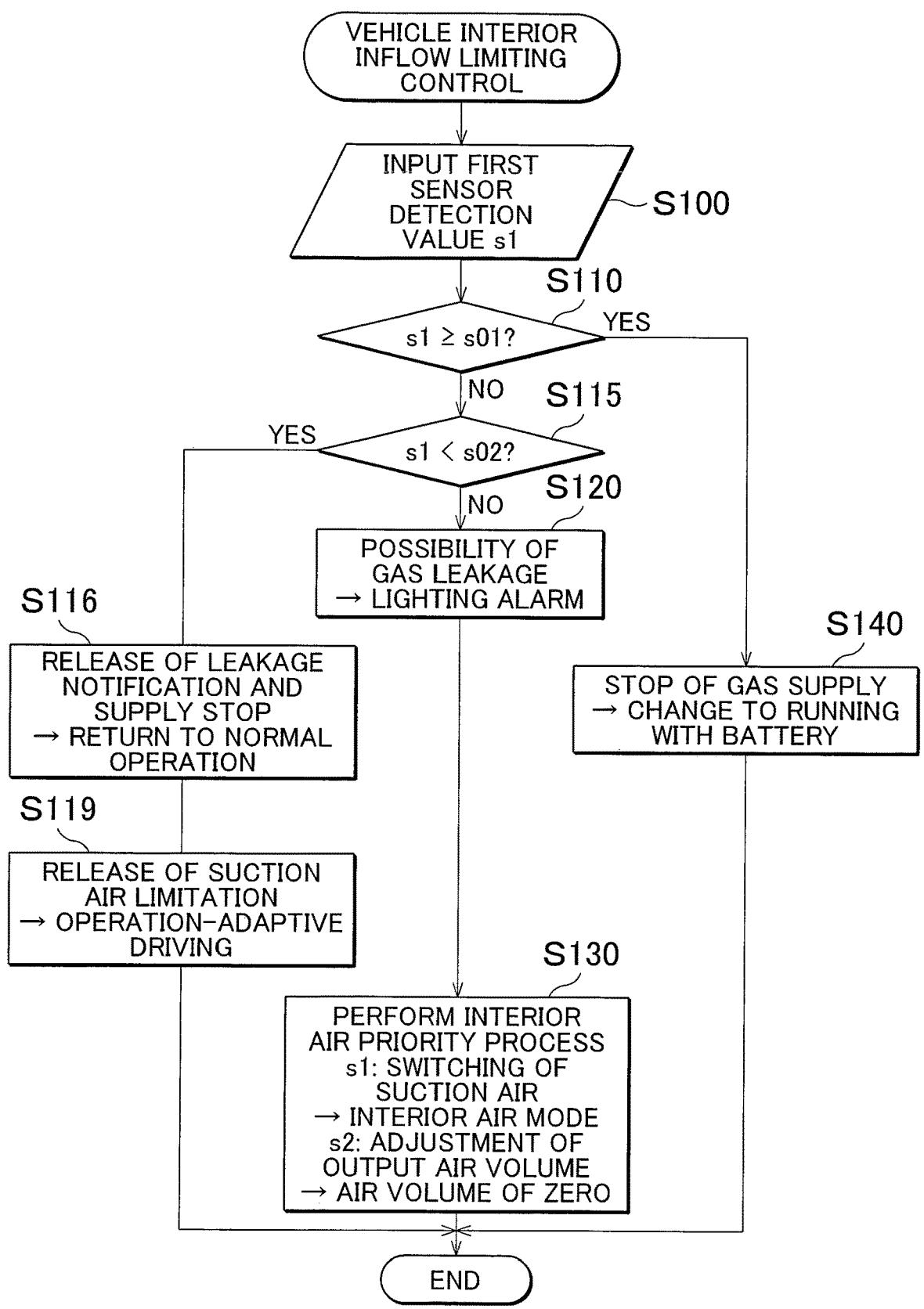
FIG. 2 is a flowchart illustrating processing details of vehicle interior inflow limiting control.

The vehicle interior inflow limiting control which is performed in the vehicle 10 according to this embodiment will be described below. FIG. 2 is a flowchart illustrating processing details of the vehicle interior inflow limiting control. The vehicle interior inflow limiting control is repeatedly performed every predetermined time after an ignition key (not illustrated) is turned on, and the controller 200 receives an input of a hydrogen gas concentration s1 of the vehicle interior front zone 30 from the first gas sensor 140 (step S100), and determines whether the input hydrogen gas concentration s1 is equal to or greater than a first reference concentration s01 (step S110). The first reference concentration s01 is defined in advance in consideration of the lower limit (4.0%) of a hydrogen ignition concentration and is set to a gas concentration in a range of 3.0% to 4.0% in this embodiment.

When hydrogen gas leaks from the vicinity of the first gas tank 111 or the second gas tank 112 and the leaking hydrogen gas diffuses from the vehicle interior under-floor zone 40 to the vehicle interior front zone 30, the hydrogen gas concentration s1 of the first gas sensor 140 increases. The hydrogen gas concentration s1 increases as the diffusion of the leaking hydrogen gas to the vehicle interior front zone 30 progresses. Accordingly, even when the determination result of step S110 is negative and the leaking hydrogen gas diffuses into the vehicle interior front zone 30, only leaking hydrogen gas of a low concentration less than the first reference concentration s01 (3.0% to 4.0%) is present in the vehicle interior front zone 30.

In the vehicle 10 according to this embodiment, subsequent to the negative determination of step S110, the controller 200 compares the hydrogen gas concentration s1 with a second reference concentration s02 and determines whether the hydrogen gas concentration s1 is less than the second reference concentration s02 (step S115). The second reference concentration s02 is defined in advance in consideration of a hydrogen gas concentration not giving a discomfort to the operator even when the hydrogen gas leaking and diffusing to the vehicle interior front zone 30 enters the vehicle interior 20, and is set to 1.0% in this embodiment. That is, even when the leaking hydrogen gas diffuses into the vehicle interior front zone 30 in only a low concentration less than the first reference concentration s01 (negative determination in step S110), the inflow of the hydrogen gas into the vehicle interior 20 may not be preferable and thus the controller 200 further performs the concentration comparison in step S115. Even when the determination result of step S115 is positive and the leaking hydrogen gas diffuses into the vehicle interior front zone 30, only the leaking hydrogen gas of a very low concentration less than the second reference concentration s02 (1.0%) is present in the vehicle interior front zone 30 or the leaking hydrogen gas is not present in the vehicle interior front zone 30 at all. Accordingly, the controller 200 determines that the inflow limitation of the leaking hydrogen gas into the vehicle interior 20 is unnecessary, sequentially performs the release (cancel) of the previously performed gas leakage notification and gas supply stop (step S116) and the release of the previously-performed suction air limitation (step S119), and then temporarily ends this routine. Accordingly, subsequently to the positive determination (s1<s02=1.0%) of step S115, the controller 200 controls the air-conditioning device group 190 and the like so as to perform air-conditioning control suitable for the output signals of the suction air switching button 172 operated by the operator with the operator's air-conditioning intention. This air-conditioning control includes an air-conditioning control routine (not illustrated) of inputting the output signals of the suction air switching button 172, the air volume adjusting switch 174, and the like and driving the devices of the air-conditioning device group 190 or the like. The controller 200 performs the gas supply corresponding to the operator's operation of an accelerator in accordance with a running control routine (not illustrated).

In the below description, a diffusion increasing state in which the diffusion of the leaking hydrogen gas into the vehicle interior front zone 30 slowly progresses and the hydrogen gas concentration s1 increases and a diffusion decreasing state in which the leakage of hydrogen gas is stabilized or the leaking hydrogen gas having diffused into the vehicle interior front zone 30 is discharged out of the vehicle from the cowl 27 or the like and the hydrogen gas concentration s1 in the vehicle interior front zone 30 decreases will be described separately. In the diffusion increasing state, the hydrogen gas concentration s1 of the first gas sensor 140 increases from a zero concentration and reaches the second reference concentration s02. In the diffusion increasing state until the hydrogen gas concentration s1 reaches the second reference concentration s02, the determination result of step S110 is negative and the determination result of step S115 is positive. Accordingly, in step S116, the controller 200 sequentially performs the release of the previously performed gas leakage notification and gas supply stop (step S116) and the release of the previously-performed suction air limitation (step S119) and temporarily ends this routine. Accordingly, in the air-conditioning control subsequent to the positive determination of step S115, the air-conditioning device group 190 or the like is controlled to be suitable for the output signals of the suction air switching button 172, the air volume adjusting switch 174, and the like as described above.

In the diffusion increasing state in which the hydrogen gas concentration s1 of the first gas sensor 140 is greater than the second reference concentration s02, the determination result of step S110 is negative, the determination result of step S115 is negative, and control related to the inflow limitation subsequent to step S120 to be described later is performed. That is, when a gas concentration specified state in which the hydrogen gas concentration sl is greater than the second reference concentration s02 (0.1%) is reached, or until the hydrogen gas concentration s1 is greater than the second reference concentration s02 and reaches the first reference concentration s01 (3.0% to 4.0%), the leaking hydrogen gas of a low concentration diffuses into the vehicle interior front zone 30. Accordingly, subsequently to the negative determination of step S115, the controller 200 first notifies the possibility of hydrogen gas leakage through the lighting control of the alarm lamp 160 or the like in step S120 so as to notify the leakage of hydrogen gas of a low concentration. The lighting control of the alarm lamp 160 is continuously performed until the hydrogen gas concentration s1 becomes equal to or less than the second reference concentration s02 and the notification is released in step S116, and the lighting state of the alarm lamp 160 may be changed depending on the hydrogen gas concentration sl. For example, the lighting of the alarm lamp 160 may be controlled so that the higher the hydrogen gas concentration s1 becomes, the shorter the flickering period becomes. In addition to or instead of the lighting notification using the alarm lamp 160, the possibility of hydrogen gas leakage may be notified in voice, character display, or sign display by the use of an acoustic device or a display device (not illustrated) disposed in the in-panel 50.

Subsequent to the leakage notification of step S120, the controller 200 performs an interior air priority process on the air-conditioner unit 180 so as to limit the leaking hydrogen gas flowing in the vehicle interior 20 (step S130). In the interior air priority process, at least one of a suction air switching process (S1 process) through the switching control of the interior/exterior air switching device 182 and an output air volume zero switching process (S2 process) through the air volume control of the blower 184 is performed and then this routine ends. In the S1 process in the process of step S130, the controller 200 puts priority on the switching control of the interior/exterior air switching device 182 to the interior air mode regardless of the operation state of the suction air switching button 172 by the operator, that is, regardless of the mode selection signal of the interior air mode or the exterior air mode output from the suction air switching button 172 by the operator's operation. In the S2 process in the process of step S130, the controller 200 puts priority on the stop control of the blower 184 to reach an air volume of zero regardless of the operating state of the air volume adjusting switch 174 by the operator, that is, regardless of the air volume signal output from the air volume adjusting switch 174 by the operator's operation.

In the diffusion increasing state in which the hydrogen gas concentration s1 of the first gas sensor 140 further increases and becomes greater than the first reference concentration s01 (3.0% to 4.0%) or in the diffusion decreasing state in which the hydrogen gas concentration s1 of the first gas sensor 140 is greater than the first reference concentration sol or the hydrogen gas concentration sl greater than the first reference concentration s01 gets close to the first reference concentration s01, the determination result of step S110 is positive. When the determination result of step S110 is positive, the leaking hydrogen gas of a high concentration greater than the first reference concentration s01 (3.0% to 4.0%) has diffused into the vehicle interior front zone 30 and thus the controller 200 stops the gas supply to the fuel cell 100 (step S140) and ends this routine. That is, since the hydrogen gas of a high concentration greater than the first reference concentration s01 (3.0% to 4.0%) leaks, the controller 200 closes the supply valves attached to the caps of both tanks of the first gas tank 111 and the second gas tank 112 and closes the cutoff valve 123 so as to avoid any more leakage. The air supply to an air supply system (not illustrated) is intercepted. Accordingly, further hydrogen gas leakage is not caused. After the stop of gas supply in step S140, the controller 200 supplies power from a battery to a drive motor (not illustrated) so as to achieve running of the vehicle with the battery (not illustrated) mounted on the vehicle 10. In this case, before the positive determination (s1≥s01=3.0% to 4.0%) of step S110 is made, the negative determination (s1>s02=1.0%) of step S115 is made. Accordingly, the gas supply stop of step S140 is carried out in a state where the gas leakage notification (step S120) and the suction air limiting control (step S130) are performed in advance.

In the diffusion decreasing state in which the hydrogen gas concentration sl of the first gas sensor 140 is less than the first reference concentration s01, the determination result of step S110 is negative. In the diffusion increasing state in which the hydrogen gas concentration s1 further decreases to the second reference concentration s02, the control relevant to the inflow limitation subsequent to step S120 is continuously performed through the negative determination of step S115. On the other hand, in the diffusion decreasing state in which the hydrogen gas concentration s1 further decreases to the second reference concentration s02 or less, the controller 200 performs the process of step S116 through the positive determination of step S115. That is, in the diffusion increasing state in which the hydrogen gas concentration s1 in the vehicle interior front zone 30 is equal to or less than the second reference concentration s02 and in the diffusion decreasing state in which the leaking hydrogen gas having diffused into the vehicle interior front zone 30 decreases to the hydrogen gas concentration sl equal or less than the second reference concentration s02, the air-conditioning control suitable for the output signals of the suction air switching button 172 or the like operated by the operator with the operator's air-conditioning intention is performed by the controller 200 (step S116).

As described above, in the vehicle 10 according to this embodiment, when the suction air switching button 172 or the air volume adjusting switch 174 included in the air-conditioning setting switching group 170 is operated by the operator, the controller 200 controls the driving of the interior/exterior air switching device 182 or the blower 184 of the air-conditioner unit 180 and the air-conditioning devices of the air-conditioning device group 190 in response to the mode selection circuit output from the suction air switching button 172 or the air volume signal output from the air volume adjusting switch 174. Accordingly, the controller 200 of the vehicle 10 air-conditions the vehicle interior 20 to an environment corresponding to the operator's operation intention for various switches, that is, the operator's air-conditioning intention. While air-conditioning the vehicle interior, the vehicle 10 according to this embodiment prevents the leaking hydrogen gas from unintentionally entering the vehicle interior through the vehicle interior inflow limiting control illustrated in FIG. 2.

When hydrogen gas leaks from the vehicle interior underfloor zone 40 which is a zone in which the fuel cell 100, the first gas tank 111, the second gas tank 112, and the like are mounted and the leaking hydrogen gas diffuses to the vehicle interior front zone 30, the leaking hydrogen gas is mixed into the air (vehicle exterior air) in the vehicle interior front zone 30 to be conditioned. In the vehicle 10 according to this embodiment, the concentration of the leaking hydrogen gas in the vehicle interior front zone 30 is detected by the first gas sensor 140 (hydrogen gas concentration s1), priority is put on the air-conditioning using the vehicle interior air by performing at least one of the suction air switching process (S1 process) through the switching control of the interior/exterior air switching device 182 and the output air volume zero switching process (S2 process) through the air volume control of the blower 184 (step S130) when the hydrogen gas concentration sl reaches the second reference concentration s02 due to the diffusion of the leaking hydrogen gas (negative determination in step S115). Accordingly, in the vehicle 10 according to this embodiment, the vehicle exterior air which is the air in the vehicle interior front zone 30 into which the leaking hydrogen gas has diffused is excluded from the air-conditioning target. As a result, it is possible to more satisfactorily prevent the leaking hydrogen gas diffusing into the vehicle interior front zone 30 from entering the vehicle interior 20.

In the vehicle 10 according to this embodiment, when the hydrogen gas concentration s1 in the vehicle interior front zone 30 detected by the first gas sensor 140 reaches the second reference concentration s02 (negative determination in step S115), the interior air mode switching control of the interior/exterior air switching device 182 and the stop control of the blower 184 (step S130) are performed. The interior air mode switching control of the interior/exterior air switching device 182 is performed regardless of the mode selection signal of the interior air mode or the exterior air mode output from the suction air switching button 172 by the operator's operation, and switches the suction air into the air-conditioner unit 180 to the interior air in the vehicle interior 20. The stop control of the blower 184 is performed regardless of the air volume signal output from the air volume adjusting switch 174 by the operator's operation, and transmission of the conditioned air from the air-conditioner unit 180 to the vehicle interior 20 is stopped. Accordingly, in the vehicle 10 according to this embodiment, even when the leaking hydrogen gas stays in the vehicle interior front zone 30 until reaching the second reference concentration s02, it is possible to satisfactorily prevent the leaking hydrogen gas staying in the vehicle interior front zone 30 from entering the vehicle interior 20 by the interior air mode switching control of the interior/exterior air switching device 182 and the stop control of the blower 184. Since the leaking hydrogen gas is prevented from entering the vehicle interior 20 by controlling the driving of the interior/exterior air switching device 182 or the blower 184 which is mounted as standard equipment in the vehicle 10, the device configuration or control is simplified and a new device configuration is not necessary, thereby achieving a decrease in cost of the vehicle 10.

In the vehicle 10 according to this embodiment, in the diffusion increasing state in which the hydrogen gas concentration s1 in the vehicle interior front zone 30 increases from the zero concentration and reaches the second reference concentration s02 and in the diffusion decreasing state in which the leaking hydrogen gas having diffused into the vehicle interior front zone 30 decreases up to a hydrogen gas concentration s1 equal to or less than the second reference concentration s02, the controller 200 controls the air-conditioning device group 190 or the like to perform air-conditioning control suitable for the output signals of the suction air switching button 172 and the like operated by the operator with the operator's air-conditioning intention (step S116). Accordingly, it is possible to suppress the discomfort given to the operator in the diffusion increasing state and the diffusion decreasing state.

In the vehicle 10 according to this embodiment, since the interior/exterior air switching device 182 is switched to the interior air mode, the exterior air including the air in the vehicle interior front zone 30 is not suctioned into the air-conditioner unit 180. In addition, the blower 184 is controlled to stop and the transmission of the conditioned air from the air-conditioner unit 180 to the vehicle interior 20 is stopped. As a result, in the vehicle 10 according to this embodiment, even when leaking hydrogen gas diffuses into the vehicle interior front zone 30, it is possible to improve the effectiveness of preventing the leaking fuel gas from entering the vehicle interior.

In the vehicle 10 according to this embodiment, when the hydrogen gas concentration s1 in the vehicle interior front zone 30 is equal to or greater than the second reference concentration s02 (1.0%) (negative determination in step S115), the concentration thereof is lower than the lower limit (4.0%) of the hydrogen ignition concentration but the diffusion of the leaking hydrogen gas into the vehicle interior front zone 30 occurs. Accordingly, the possibility of the hydrogen gas leakage is notified through the lighting control of the alarm lamp 160 (step S120). As a result, in the vehicle 10 according to this embodiment, it is possible to perform maintenance and inspection of the first gas tank 111 and the second gas tank 112 or the first hydrogen supply pipe 121, the second hydrogen supply pipe 122, and the cutoff valve 123 connecting them to each other.

In the vehicle 10 according to this embodiment, when the hydrogen gas concentration sl in the vehicle interior front zone 30 is equal to or greater than the first reference concentration s01 (3.0% to 4.0%) (positive determination in step S110), the concentration is close to the lower limit (4.0%) of the hydrogen ignition concentration and thus the gas supply to the fuel cell 100 is stopped (step S140). Accordingly, in the vehicle 10 according to this embodiment, it is possible to prevent further leakage of hydrogen gas and to enable the vehicle 10 to run using the battery. When the possibility of the hydrogen gas leakage is notified before the hydrogen gas concentration s1 becomes equal to or greater than the first reference concentration s01 (3.0% to 4.0%) (step S120), the vehicle 10 normally runs and thus the operator may not rapidly cause the vehicle 10 to run to a maintenance and inspection factory or a gas station. In the vehicle 10 according to this embodiment, the progression of the hydrogen gas leakage is avoided by the stop of the gas supply and then the vehicle 10 can be made to continuously run until reaching a maintenance and inspection station or a gas station by allowing the vehicle to run using the battery.

Figure 3:
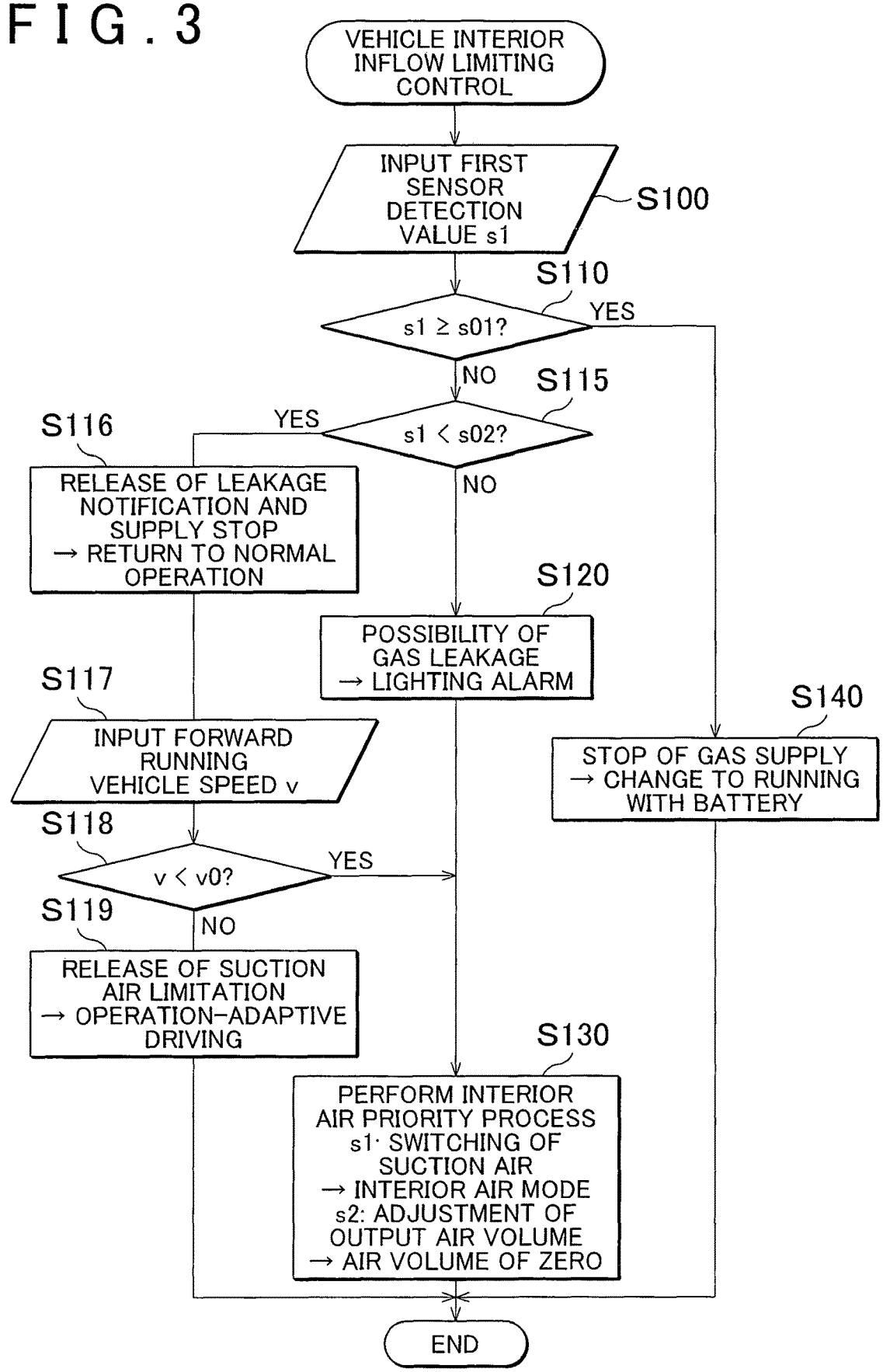
FIG. 3 is a flowchart illustrating processing details of vehicle interior inflow limiting control according to another embodiment.

The vehicle interior inflow limiting control that is performed in another embodiment will be described below. FIG. 3 is a flowchart illustrating processing details of the vehicle interior inflow limiting control according to this embodiment. The vehicle interior inflow limiting control is characterized in that a forward vehicle speed v of the vehicle 10 running forward is considered. As illustrated in the drawing, in the vehicle interior inflow limiting control according to this embodiment, after the notification of gas leakage and the stop of gas supply are released (step S116) subsequent to the positive determination (s1<s02=1.0%) of step S115, a current vehicle speed (forward vehicle speed v) is input from a vehicle speed sensor (not illustrated) (step S117). Subsequent to the input of the forward vehicle speed v in step S117, the controller 200 compares the forward vehicle speed v with a reference vehicle speed v0 and determines whether the forward vehicle speed v is less than the reference vehicle speed v0 (step S118).

The reference vehicle speed v0 in step S118 is determined in advance in consideration of the air flow generated from the vehicle front side to the vehicle rear side in the vicinity of the vehicle in a state where the vehicle 10 runs forward, and is set to a vehicle speed in a range of 5 km/h to 10 km/h. That is, when the vehicle 10 runs forward at a vehicle speed equal to or greater than the reference vehicle speed v0 (5 km/h to 10 km/h), the air flow from the vehicle front side to the vehicle rear side is necessarily generated and it is assumed that leaking hydrogen gas in the vehicle interior under-floor zone 40 hardly diffuses from the vehicle interior under-floor zone 40 side to the vehicle interior front zone 30 side due to the influence of the air flow.

The air flow generated due to the forward running of the vehicle 10 at a vehicle speed equal to or greater than the reference vehicle speed v0 (5 km/h to 10 km/h) flows in the vehicle interior front zone 30, and air loaded into the air flow passes through the vehicle interior front zone 30, flows in the vehicle interior under-floor zone 40, and also flows out of the vehicle along the front windowshield via the cowl 27 which is the joint between the hood 26 and the front windowshield. The higher the forward vehicle speed becomes, the higher the flow rate of the air flow becomes. Accordingly, when the forward vehicle speed v is high, leaking hydrogen gas diffuses into the vehicle interior front zone 30 but the leaking hydrogen gas hardly stays in the vehicle interior front zone 30. As a result, by defining the reference vehicle speed v0 to be compared with the forward vehicle speed v as a speed at which the leaking hydrogen gas hardly stays in the vehicle interior front zone 30, the forward vehicle speed v is high and thus the amount of leaking hydrogen gas in the vehicle interior front zone 30 is very small in the state where the determination result of step S118 is negative (v≥v0). Therefore, when the determination result of step S118 is negative, the controller 200 determines that the inflow limitation of the leaking hydrogen gas into the vehicle interior 20 is unnecessary, performs the release (cancel) of the suction air limitation (step S119), and then temporarily ends this routine.

On the other hand, when the determination result of step S118 is positive (v<v0), the controller 200 determines that the vehicle 10 runs forward at a low speed less than the reference vehicle speed v0 (5 km/h to 10 km/h). At this time, since the above-mentioned air flow is weak, the leaking hydrogen gas easily diffuses to the vehicle interior front zone 30 side and easily stays in the vehicle interior front zone 30. Accordingly, the controller 200 causes the routine to step S130 in the interior air priority process in order to perform the inflow limitation of the leaking hydrogen gas into the vehicle interior 20 and performs at least one of the suction air switching process (S1 process) through the switching control of the interior/exterior air switching device 182 and the output air volume zero switching process (S2 process) through the air volume control of the blower 184.

As described above, by employing the vehicle interior inflow limiting control illustrated in FIG. 3 according to this embodiment, even when the hydrogen gas concentration s1 is low (s1<s02=1.0%) enough to set the determination result of step S115 to be positive but the vehicle 10 runs forward at a low speed less than the reference vehicle speed v0 (5 km/h to 10 km/h) (positive determination in step S118), any one of the interior air mode switching control (S1 process in step S130) of the interior/exterior air switching device 182 and the stop control (S2 process in step S130) of the blower 184 is performed. The interior air mode switching control of the interior/exterior air switching device 182 is performed regardless of the mode selection signal of the interior air mode or the exterior air mode output from the suction air switching button 172 by the operator's operation so as to switch the suction air into the air-conditioner unit 180 to the interior air in the vehicle interior 20. The stop control of the blower 184 is performed regardless of the air volume signal output from the air volume adjusting switch 174 by the operator's operation so as to stop the transmission itself of the conditioned air from the air-conditioner unit 180 to the vehicle interior 20. Accordingly, in the vehicle 10 according to this embodiment, since the vehicle 10 runs forward at a low speed less than the reference vehicle speed v0 (5 km/h to 10 km/h), it is possible to satisfactorily prevent the leaking hydrogen gas staying in the vehicle interior front zone 30 from entering the vehicle interior 20 by any one of the interior air mode switching control of the interior/exterior air switching device 182 and the stop control of the blower 184 even when the leaking hydrogen gas stays in the vehicle interior front zone 30 until reaching the second reference concentration s02. On the other hand, when the vehicle 10 runs forward at a speed equal to or greater than the reference vehicle speed v0 (5 km/h to 10 km/h), the air-conditioning control suitable for the output signals of the suction air switching button 172 and the like operated by the operator with the operator's air-conditioning intention is performed by the air-conditioning device group 190. In addition, this embodiment can also achieve the above-mentioned advantages such as the decrease in cost.

Figure 4:
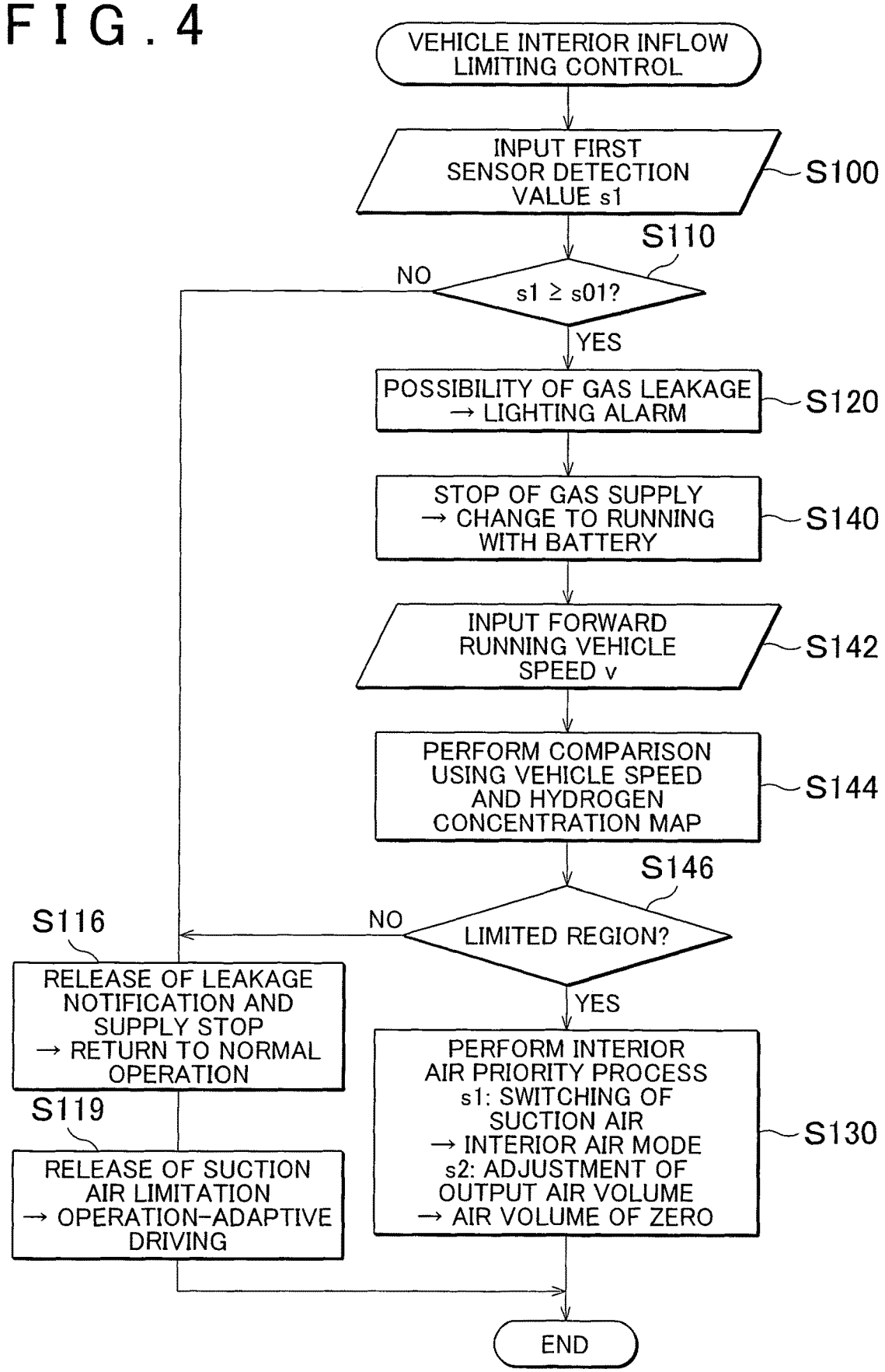
FIG. 4 is a flowchart illustrating processing details of vehicle interior inflow limiting control according to still another embodiment.

The vehicle interior inflow limiting control that is performed in still another embodiment will be described below. FIG. 4 is a flowchart illustrating processing details of the vehicle interior inflow limiting control according to this embodiment. The vehicle interior inflow limiting control is characterized in that a vehicle speed and hydrogen concentration correspondence map in which the forward vehicle speed v of the vehicle 10 running forward and the hydrogen gas concentration sl detected by the first gas sensor 140 in the vehicle interior front zone 30 are compared is used. As illustrated in the drawing, in the vehicle interior inflow limiting control according to this embodiment, subsequently to the negative determination of step S110 (s1<s01=3.0~4.0%), the release of the gas leakage notification and the gas supply stop (step S116) and the release of the suction air limitation (step S119) are sequentially performed and then this routine temporarily ends. Accordingly, subsequently to the negative determination of step S110 (s1<s01=3.0~4.0%), the controller 200 controls the air-conditioning device group 190 or the like so as to perform the air-conditioning control suitable for the output signals of the suction air switching button 172 and the like operated by the operator with the operator's air-conditioning intention. That is, in the vehicle interior inflow limiting control according to this embodiment, the processes of step S116 and steps subsequent thereto are performed without comparison with the second reference concentration s02 (1.0%) are performed, and the driving of the devices of the air-conditioning device group 190 corresponding to the operating state of the suction air switching button 172 or the air volume adjusting switch 174 and the running control accompanied with the gas supply corresponding to the operator's operation of the accelerator are performed.

Figure 5:
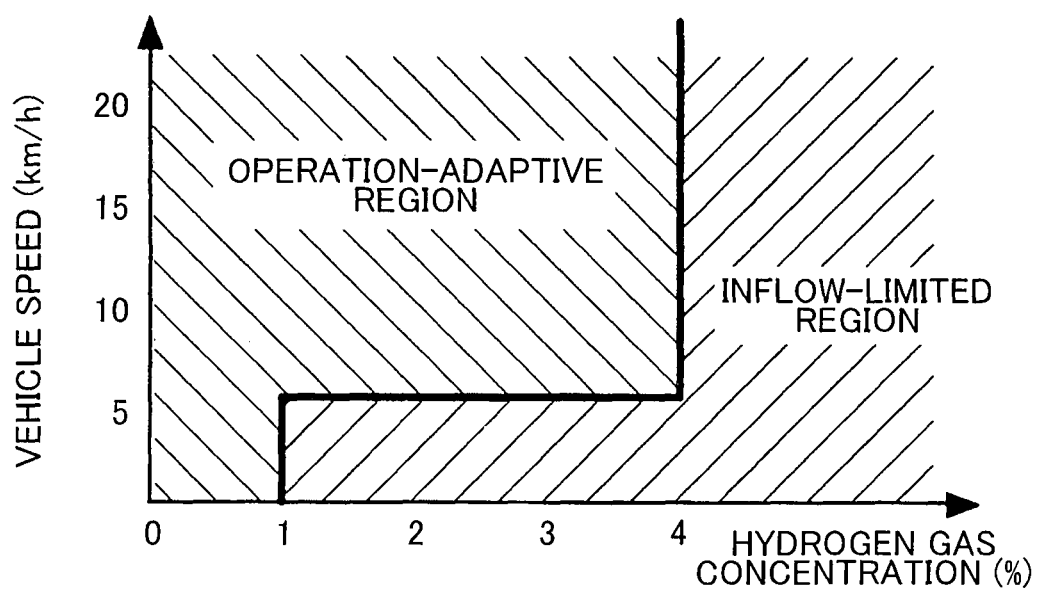
FIG. 5 is a graph illustrating a vehicle speed and hydrogen concentration correspondence map stored in advance in a memory area of a controller 200.

On the other hand, when the determination result of step S110 is positive (s1≥s01=3.0~4.0%), the controller 200 receives an input of the current vehicle speed (forward vehicle speed v) from the vehicle sensor (step S142), subsequently to the gas leakage notification (step S120) through the lighting control of the alarm lamp 160 and the gas supply step (step S140) to the fuel cell 100. Then, the input forward vehicle speed v and the hydrogen gas concentration s1 input in step S100 are compared with the vehicle speed and hydrogen concentration correspondence map (step S144). FIG. 5 is a graph illustrating the vehicle speed and hydrogen concentration correspondence map stored in advance in a memory area of the controller 200. In the vehicle speed and hydrogen concentration correspondence map, the horizontal axis is set to the hydrogen gas concentration s1 detected by the first gas sensor 140 and the vertical axis is set to the forward vehicle speed v detected by the vehicle speed sensor so as to correspond to each other, the region in which the hydrogen gas concentration s1 ranges from 1.0% to 4.0% and the forward vehicle speed v is equal to or less than 5 km/h represents an inflow-limited region in which the inflow limitation of the leaking hydrogen gas into the vehicle interior 20 is necessary. In the vehicle speed and hydrogen concentration correspondence map, the region in which the hydrogen gas concentration s1 is equal to or greater than 4.0% represents the inflow-limited region even at any forward vehicle speed v (including a zero vehicle speed at which the vehicle stops). The region other than the inflow-limited region in the vehicle speed and hydrogen concentration correspondence map, since the hydrogen gas concentration s1 is low or the forward vehicle speed is high represents an operation-adaptive region in which the air-conditioning control adaptive to the operation of the suction air switching button 172 or the like can be satisfactorily performed without considering the inflow limitation of the leaking hydrogen gas into the vehicle interior 20 as described above.

When it is determined that the forward vehicle speed v and the hydrogen gas concentration sl belong to the inflow-limited region of FIG. 5 through the comparison with the vehicle speed and hydrogen concentration correspondence map in step S146, the controller 200 performs at least one of the suction air switching process (S1 process) through the switching control of the interior/exterior air switching device 182 and the output air volume zero switching process (S2 process) through the air volume control of the blower 184 as the same interior air priority process as in step S130 (step S130), and then temporarily ends this routine. On the other hand, when it is determined that the forward vehicle speed v and the hydrogen gas concentration sl belong to the operation-adaptive region, the controller determines that the inflow limitation of the leaking hydrogen gas into the vehicle interior 20 is unnecessary, transfers the routine to step S116, and performs the air-conditioning control (step S116) suitable for the output signals of the suction air switching button 172, the air volume adjusting switch 174 and the like and the running control (step S119) accompanied with the gas supply corresponding to the operator's operation of the accelerator as described above.

Even by the above-mentioned vehicle interior inflow limiting control according to the embodiment illustrated in FIG. 4, the above-mentioned advantages such as the prevention of the leaking hydrogen gas staying in the vehicle interior front zone 30 from entering the vehicle interior 20 can be achieved.

The invention is not limited to the above-mentioned embodiments but can be modified in various forms without departing from the gist thereof. For example, technical features of the embodiments corresponding to the technical features of the aspects described in the section of SUMMARY OF THE INVENTION can be appropriately interchanged or combined so as to solve a part or all of the above-mentioned problems or to achieve a part of all of the above-mentioned advantages. When the technical features are not described to be essential in this specification, the technical features can be appropriately deleted.

The vehicle 10 according to the above-mentioned embodiment performs any one control of the switching control (S1 control) of the interior/exterior air switching device 182 and the air volume control (S2 control) of the blower 184 in the interior air priority control of step S130, but may simultaneously perform both controls in parallel.

In preventing the leaking hydrogen gas from entering the vehicle interior 20 in the vehicle 10 according to the above-mentioned embodiments, the output air volume zero switching process (S2 process) through the air volume control of the blower 184 is performed in the interior air priority process of step S130, but the invention is not limited to this process. For example, even when the operator operates the air volume adjusting switch 174 to set the air volume to a large air volume side, the set air volume may be reduced or may be limited to a minimum air volume.

In the vehicle 10 according to the above-mentioned embodiments, an alarm indicating that the air-conditioning is limited against the operator's air-conditioning intention may also be given at the time of giving an alarm indicating the possibility of the hydrogen gas leakage through the use of the lighting control of the alarm lamp 160 (step S120). In this case, it is possible to reduce discomfort of the operator operating the suction air switching button 172 or the air volume adjusting switch 174 with an air-conditioning intention.

In the vehicle 10 according to the above-mentioned embodiments, malfunction of sensors may be determined as follows. When the vehicle 10 runs forward at a vehicle speed equal to or greater than the reference vehicle speed v0 (5 km/h to 10 km/h), the leaking hydrogen gas hardly diffuses from the vehicle interior under-floor zone 40 side to the vehicle interior front zone 30 side by the influence of the air flow from the vehicle front side to the vehicle rear side as described above and the leaking hydrogen gas hardly stays in the vehicle interior front zone 30 by discharge of the leaking hydrogen gas out of the vehicle from the cowl 27. Accordingly, in the state where the vehicle 10 runs forward at a vehicle speed equal to or greater than the reference vehicle speed v0 (5 km/h to 10 km/h), it is predicted that the leaking hydrogen gas concentration in the vehicle interior front zone 30 is less than the above-mentioned first reference concentration s01 (3.0% to 4.0%). Accordingly, when the hydrogen gas concentration sl in the vehicle interior front zone 30 detected by the first gas sensor 140 is greater than the first reference concentration s01 (3.0% to 4.0%) in the state where the vehicle 10 runs forward at a vehicle speed equal to or greater than the reference vehicle speed v0 (5 km/h to 10 km/h), it is possible to determine that the first gas sensor 140 malfunctions.

What is claimed is:
1. A fuel cell vehicle comprising:
   a fuel cell that is supplied with fuel gas and oxidizing gas and generates electric power;
   fuel gas tanks that stores the fuel gas to be supplied to the fuel cell;

a battery storing electric power for running the vehicle;
a controller comprising a CPU, a ROM, a RAM, and an input and output port; and
a gas sensor, that is configured to quantitatively detect a hydrogen gas concentration, disposed inside a vehicle interior front zone which is a zone below a hood on a vehicle front side and which occupies a front side of the vehicle interior and adapted to detect a fuel gas concentration in the vehicle interior front zone of the fuel gas leaking from a zone in which the fuel cell and the fuel gas tanks are mounted, the gas sensor being disposed in an upper region of the vehicle interior front zone at the vehicle interior side, wherein
the controller is programmed to either air-condition a vehicle interior using vehicle interior air and blow the vehicle interior air into the vehicle interior, or air-condition the vehicle interior using vehicle exterior air and blow the vehicle exterior air into the vehicle interior, and to air-condition the vehicle interior to various temperatures by adjusting an air volume ratio of cool air and hot air from at least one of the vehicle interior air and the vehicle exterior air;
the controller is further programmed to compare the detected fuel gas concentration with a first predetermined threshold concentration and a second predetermined threshold concentration that is lower than the first predetermined threshold concentration, and
if the detected fuel gas concentration is less than the second predetermined threshold concentration, air-conditioning the vehicle interior using vehicle exterior air;
if the detected fuel gas concentration is between the first and second predetermined threshold concentrations, air-conditioning the vehicle interior using vehicle interior air; and
stops the fuel gas supply to the fuel cell in response to the detected fuel gas concentration being greater than the first predetermined concentration,
the fuel cell vehicle, further comprising:
an air-conditioning setting switching group comprising a suction air switching button and an air volume adjusting switch operation device that is disposed in the vehicle interior, that is operated by an operator, and that outputs an air-conditioning signal corresponding to an operation;
an air switch that switches suction air to any one of vehicle interior air and vehicle exterior air; and
a blower that blows air to the vehicle interior,
wherein the controller is further programmed to perform driving of the air switch and the blower regardless of the air-conditioning signal so as to suppress entry of the vehicle exterior air into the vehicle interior when the air-conditioning signal is input and it is determined that the detected fuel gas concentration is between the first and second predetermined threshold concentrations,
wherein the controller is further programmed to control at least one of the air switch and the blower so as to control the air switch to switch the suction air to the vehicle interior air and to control driving of the blower to a decreased air volume side including an air volume of zero regardless of the air-conditioning signal when it is determined that the detected fuel gas concentration is between the first and second predetermined threshold concentrations.

2. The fuel cell vehicle according to claim 1, wherein the controller is further programmed to perform air-conditioning the vehicle interior using vehicle interior air when it is determined that the detected fuel gas concentration is between the first and second predetermined threshold concentrations in a state where the fuel cell vehicle runs forward at a speed equal to or lower than a predetermined threshold speed.

3. The fuel cell vehicle according to claim 1, wherein the gas sensor is disposed in front of an instrument panel of the vehicle interior.

4. The fuel cell vehicle according to claim 3, wherein the gas sensor is disposed in the vehicle interior front zone proximate to a cowl which is a joint between a hood and a front window shield below the hood inclined so as to descend to the front side of the vehicle.

5. The fuel cell vehicle according to claim 1, wherein the fuel gas tanks comprise a first fuel gas tank and a second fuel gas tank and are disposed below an underbody.

6. The fuel cell vehicle according to claim 5, wherein the first fuel gas tank is disposed at a middle position between the fuel cell and the second gas tank and is connected to the fuel cell via a first hydrogen supply pipe.

7. The fuel cell vehicle according to claim 5, wherein a second hydrogen supply pipe is disposed between the first gas tank and the second gas tank via a cutoff valve.

8. The fuel cell vehicle according to claim 7, wherein a second gas sensor is disposed above the cutoff valve in a vehicle interior under-floor zone.

9. The fuel cell vehicle according to claim 7, wherein the controller is further programmed to close supply valves attached to both the first gas tank and the second gas tank and to close the cutoff valve, when the hydrogen gas concentration is greater than a first reference concentration.

10. A control method of a fuel cell vehicle, the fuel cell vehicle having an air-conditioning setting switching group comprising a suction air switching button and an air volume adjusting switch that is disposed in a vehicle interior, that is operated by an operator, and that outputs an air-conditioning signal corresponding to an operation, an air switch that switches suction air to any one of vehicle interior air and vehicle exterior air, and a blower that blows air to the vehicle interior, and a controller comprising a CPU, a ROM, a RAM, and an input and output port, the control method comprising:
storing electric power for running the fuel cell vehicle with a battery;
detecting a fuel gas concentration of fuel gas leaking from a zone in which a fuel cell and fuel gas tanks are mounted in the fuel cell vehicle;
comparing the detected fuel gas concentration using a gas sensor, that is configured to quantitatively detect a hydrogen gas concentration, with a first predetermined threshold concentration or a second predetermined threshold concentration that is lower than the first predetermined threshold concentration,
performing priority control of putting higher priority on air-conditioning using the vehicle interior air rather than air-conditioning using the vehicle exterior air when it is determined that the detected fuel gas concentration is greater than the second predetermined threshold concentration; and
stopping fuel gas supply to the fuel cell and achieving running of the fuel cell vehicle with the stored power of the battery when it is determined that the detected fuel gas concentration is greater than the first predetermined concentration,
controlling driving of the air switch and the blower regardless of the air-conditioning signal so as to suppress entry of the vehicle exterior air into the vehicle interior when the air-conditioning signal is input and it is determined that the detected fuel gas concentration is between the first and second predetermined threshold concentrations with the controller, and controlling at least one of the air switch and the blower so as to control the air switch to switch the suction air to the vehicle interior air and to control driving of the blower to a decreased air volume side including an air volume of zero regardless of the air-conditioning signal when it is determined that the detected fuel gas concentration is between the first and second predetermined threshold concentrations with the controller, wherein the gas sensor is disposed inside a vehicle interior front zone which is a zone below a hood on the fuel cell vehicle front side and which occupies a front side of the fuel cell vehicle interior, and the gas sensor is disposed in an upper region of the vehicle interior front zone at the vehicle interior side, wherein the fuel gas tanks comprise a first fuel gas tank and a second fuel gas tank and are disposed below an underbody;

the first fuel gas tank is disposed at a middle position between the fuel cell and the second gas tank and is connected to the fuel cell via a first hydrogen supply pipe; and a second hydrogen supply pipe is disposed between the first gas tank and the second gas tank via a cutoff valve.

11. The control method of a fuel cell vehicle according to claim 10, wherein a second gas sensor is disposed above the cutoff valve in a vehicle interior under-floor zone.

12. The control method of a fuel cell vehicle according to claim 10, wherein the controller is further programmed to closes supply valves attached to both the first gas tank and the second gas tank and to close the cutoff valve, when the hydrogen gas concentration is greater than a first reference concentration.

* * * * *